(12) United States Patent
Lauer

(10) Patent No.: US 6,579,172 B2
(45) Date of Patent: Jun. 17, 2003

(54) INCLINE RESPONSIVE SIEVE FOR A HARVESTER THRESHER

(75) Inventor: Fritz Lauer, Krähenberg (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/084,909

(22) Filed: Feb. 28, 2002

(65) Prior Publication Data

US 2002/0128054 A1 Sep. 12, 2002

(30) Foreign Application Priority Data

Mar. 10, 2001 (DE) ......................... 101 11 531

(51) Int. Cl.⁷ ................................. A01F 12/32
(52) U.S. Cl. ......................... 460/101; 460/1
(58) Field of Search ................. 460/1, 4, 5, 101, 460/102, 109, 85, 90, 93, 94, 95, 96, 146, 119

(56) References Cited

U.S. PATENT DOCUMENTS

| | | | |
|---|---|---|---|
| 2,253,296 A | | 4/1941 | Holtzman |
| 3,472,378 A | * | 10/1969 | Payne ..................... 209/394 |
| 3,497,229 A | * | 2/1970 | Sietmann et al. ............ 56/209 |
| 3,509,885 A | * | 5/1970 | Louks et al. ............... 460/100 |
| 4,036,065 A | * | 7/1977 | Strelioff et al. ............ 73/865.9 |
| 4,282,771 A | * | 8/1981 | Grube ....................... 74/505 |
| 4,344,443 A | * | 8/1982 | De Busscher et al. ......... 460/97 |
| 4,466,231 A | | 8/1984 | Rowland-Hill et al. |
| 4,502,493 A | * | 3/1985 | Jones et al. ................ 460/101 |
| 4,712,568 A | | 12/1987 | Strong et al. |
| 4,770,190 A | | 9/1988 | Barnett |
| 4,897,071 A | * | 1/1990 | Desnijder et al. ............. 460/10 |
| 4,897,072 A | | 1/1990 | Bestland |
| 5,489,029 A | | 2/1996 | Jonckheere et al. |
| 5,525,108 A | | 6/1996 | Rouse et al. |
| 5,527,219 A | * | 6/1996 | Schumacher et al. ......... 460/101 |
| 5,586,033 A | * | 12/1996 | Hall ......................... 701/50 |
| 5,624,315 A | | 4/1997 | Jonckheere |
| 5,795,223 A | | 8/1998 | Spiesberger et al. |
| 5,984,777 A | * | 11/1999 | Kuchar ..................... 460/101 |
| 6,117,006 A | | 9/2000 | Hofer |
| 6,468,154 B1 | * | 10/2002 | Eggenhaus et al. .......... 460/101 |

FOREIGN PATENT DOCUMENTS

| | | |
|---|---|---|
| DE | 7145564 | 1/1973 |
| EP | 0 104 676 | 8/1983 |
| EP | 1 068 792 A1 | 6/2000 |
| EP | 1 068 793 A1 | 6/2000 |
| EP | 1 166 617 | 1/2002 |

* cited by examiner

Primary Examiner—Thomas B. Will
Assistant Examiner—Nathan Mammen

(57) ABSTRACT

A sieve for a harvester thresher which consists of a frame and adjustable louvers that are mounted therein and can be adjusted by a motor-driven adjusting drive, wherein the sieve consists of at least two sieve elements that are arranged in the same plane and are respectively provided with a frame. In order to prevent the play of the adjusting drive and to adjust the louvers of the sieve elements independently of one another, separate adjusting drives are assigned to the sieve elements.

2 Claims, 4 Drawing Sheets

INCLINE RESPONSIVE SIEVE FOR A HARVESTER THRESHER

BACKGROUND AND SUMMARY OF THE INVENTION

The invention pertains to a sieve for a harvester thresher which consists of a frame and adjustable louvers that are mounted therein and can be adjusted by means of a motor-driven adjusting drive. The sieve comprises at least two sieve elements that are arranged in a common plane and are respectively provided with a frame.

Typically, in a harvester thresher, also known as a combine, after threshing and separation, some chaff and straw are still mixed with the grain. The cleaning unit removes this trash from the grain. In most combines, the cleaning unit comprises three major components: a cleaning fan, an upper sieve and a lower sieve. Sometimes the upper sieve is referred to as a chaffer. The upper and lower sieves are generally similar in construction, although the components may differ in size. The cleaning fan has its own housing, whereas the sieves are mounted to the cleaning shoe.

The sieves are suspended on hangers attached to the sides of the cleaning shoe. The sieves are either adjustable or non-adjustable. The adjustable sieve is made up of a series of transversely extending louvers with rows of teeth. Each of these louvers is mounted on a crankshaft having a crank arm that engages an axially extending adjusting bar. By axially moving the adjusting bar, all of the louvers are moved simultaneously.

It is known from DE 71 45 564 U, EP 1 068 792 A and EP 1 068 793 A to provide the frame of a sieve that forms part of the cleaning device of a harvester thresher with an electromotive adjusting drive in order to adjust the width of the sieve openings. In order to prevent the play created between the adjusting drive and the louvers of the sieve by intermediate transmission mechanisms in the form of Bowden cables or the like, the adjusting drive is arranged on the sieve frame.

When adjusting the sieve in accordance with EP 1 068 792 A, two sieve elements of the upper sieve, which are arranged laterally and adjacent to one another, are adjusted by a common adjusting drive. A connecting rod or a threaded spindle is arranged for this purpose between the sieve elements and transmits the driving motion of the adjusting drive from one sieve element to the other sieve element.

In this case, it is disadvantageous for the connecting rod or the threaded spindle to have a certain amount of play resulting from inaccurate adjustments of the louvers in at least one sieve element. In addition, the connecting rod must be detached and subsequently reattached when one of the sieve elements is removed for maintenance or repair purposes.

The invention is based on the objective of additionally developing a sieve for a harvester thresher which is composed of several sieve elements in such a way that a more precise adjustment of the louvers can be achieved.

In a sieve for a harvester thresher which is composed of two sieve elements that lie in the same plane, the invention proposes to assign a separate adjusting drive to each sieve element. If more than two sieve elements are provided, each of the sieve elements can be provided with a separate adjusting drive. However, it would also be conceivable to provide a first sieve element with a first adjusting drive, and to provide two or more additional sieve elements with a second, common adjusting drive.

In this way, the sieve elements can be adjusted with less play (free travel and hysteresis) and even independently of each another. When removing the sieve elements from the cleaning shoe for reasons of maintenance, cleaning or repair, it is no longer necessary to separate and reconnect the drive connection between the adjusting device and the adjacent sieve element, which is time-consuming.

The reduced surface of the louvers that is assigned to an adjusting drive makes it possible to use smaller and therefore less expensive adjusting drives. Due to their low weight, they can be directly mounted on or in the frame of the sieve element.

The sieve elements are arranged in one plane and are usually situated laterally adjacent to one another relative to the forward driving direction of the harvester thresher. However, it would also be conceivable to arrange the sieve elements one behind the other. Sieves that are composed of multiple sieve elements may be considered for lower sieves as well as upper sieves.

The adjusting drives may contain electric, hydraulic or pneumatic motors for generating a linear or rotational movement. The motors are provided with connecting elements for coupling to the power supply. The connecting elements are preferably automatically disconnected from connections that are arranged in and remain in the cleaning shoe when the sieve elements are removed, and automatically connected thereto when the sieve elements are installed. This significantly simplifies and accelerates the removal and installation of the sieve elements.

A sieve according to the invention for a harvester thresher makes it possible to adjust the louvers of the sieve elements separately, as well as to realize different adjustments of the louvers of the sieve elements, by means of a corresponding manual or automatic control. Different adjustments make sense when the harvester thresher is used on hills, where it is advantageous to close the uphill sieve element further than the downhill sieve element. In this way, the air current generated by the cleaning blower is forced to flow more intensely through the downhill sieve in order better to penetrate the layer that is naturally thicker on the downhill side. A separation of undesirable non-grain constituents is simultaneously prevented in the thinner layer on the uphill sieve. This results in an improved efficiency of the harvester thresher on hills.

According to another embodiment, the sieve elements may also be controlled as a function of the signals from sensors that are assigned to the sieve elements. Sensors of this type are able to sense the separation of grain or non-grain constituents underneath the sieve elements. Their signals are fed to a suitable control or regulating device that controls the adjusting drives of the sieve elements in such a way that separation and purity are optimized for each sieve element. This can be further simplified by utilizing more adjusting drives or separately adjustable sieve elements.

Two embodiments of the invention are illustrated in the figures and described in greater detail below.

DETAILED DESCRIPTION OF THE PREFERRED EMBODIMENT

Figure 1:
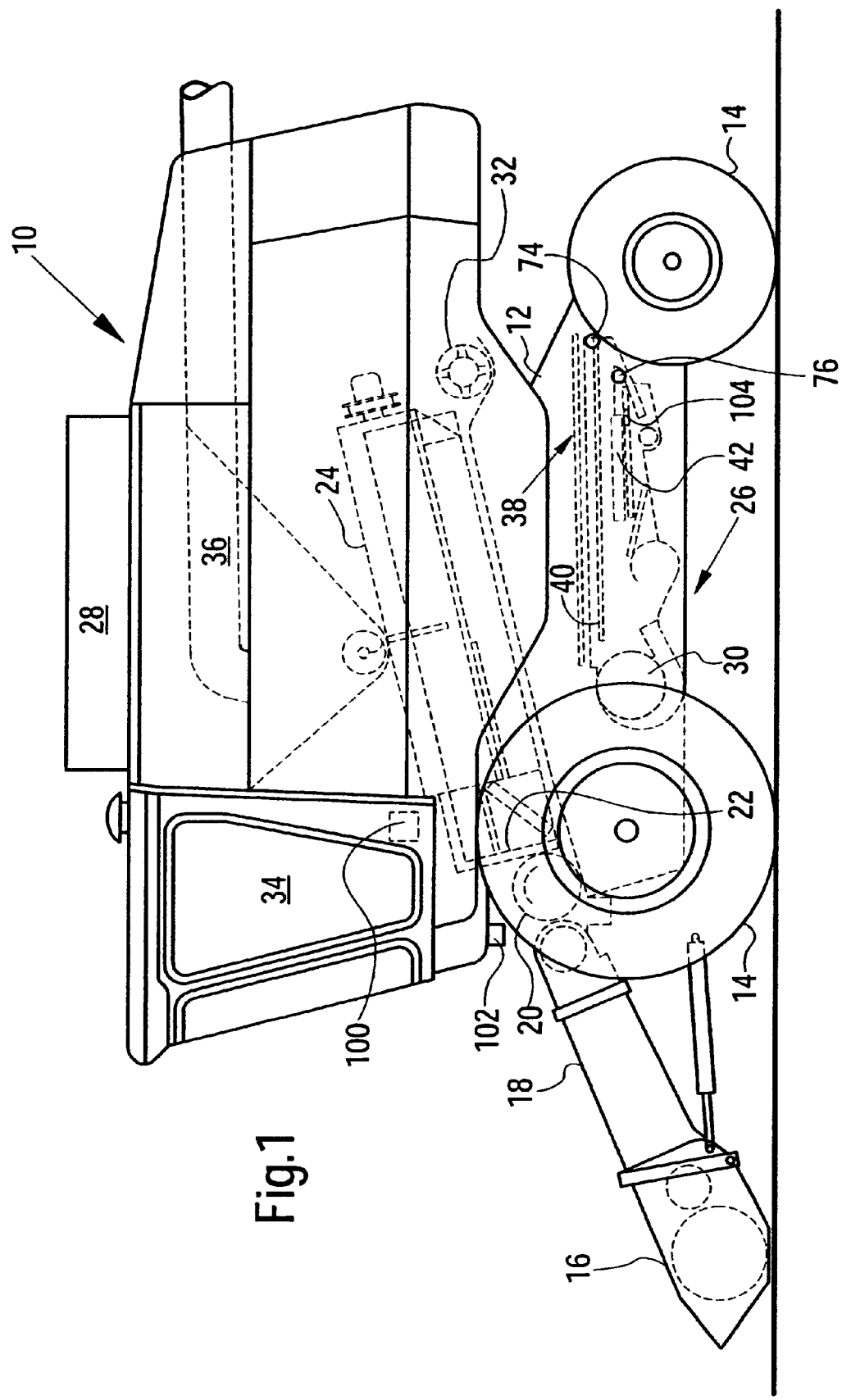
FIG. 1 is a side view of an agricultural harvester thresher in which the threshing, separating and cleaning devices are shown.

FIG. 1 shows a side view of a self-propelled agricultural harvester thresher 10. The harvester thresher 10 contains a support structure 12 with wheels 14. The support structure 12 consists of two axially extending side plates, between which the various processing devices for the material being harvested are arranged. A cutting mechanism 16 that conveys the material being harvested to a feederhouse 18 extends forward from the harvester thresher 10. The feederhouse 18 contains a conveyor for conveying the harvested material to the threshing, separating and cleaning devices arranged between the side plates of the harvester thresher 10. Although the present invention is described with reference to an axial flow harvester thresher, it may also be used on conventional harvester thresher configurations and other harvester thresher configurations with a cleaning shoe.

In the harvester thresher 10 shown, the inclined conveyor 18 conveys the harvested material to a transversely extending guide drum 20 that feeds the material to an axial threshing and separating device 24 through an inlet transition region 22. Grain and chaff are conveyed from the axial threshing and separating device 24 to a cleaning shoe 26. The cleaning shoe 26 conveys the clean grain to a grain tank 28, with the chaff being ejected on the rear side of the harvester thresher by the cleaning blower 30. Harvested material which consists of neither grain nor chaff is conveyed by the axial threshing and separating device 24 to a transversely arranged guide drum 32 that ejects the material on the rear side of the harvester thresher 10.

Harvested material that is stored in the grain tank 28 can be unloaded by the operator by actuating an unloading conveyor screw 36 in the operator's cabin 34. The threshing and separating device and the cleaning shoe are arranged between the side plates of the support structure 12.

In the harvester thresher 110 shown, an upper sieve 40 and a lower sieve 42 are arranged one above the another, where each sieve is composed of two sieve elements that lie adjacent to one another in the same plane. The sieves 40, 42 oscillate during the operation of the cleaning shoe 26 in such a way that the harvested material separated by the threshing and separating device 24 is received on the side of the sieves 40, 42 which faces the threshing and separating device 24 and is additionally conveyed opposite the driving direction of the harvester thresher 10. In order to achieve an optimal cleaning effect of the cleaning shoe 26, the rotational speed of the blower and the width of the openings in the sieves 40, 42 can be varied. According to the invention, two adjusting drives 74 and 76 are respectively assigned to each of the sieves 40 and 42 in order to adjust the width of the sieve openings.

Figure 2:
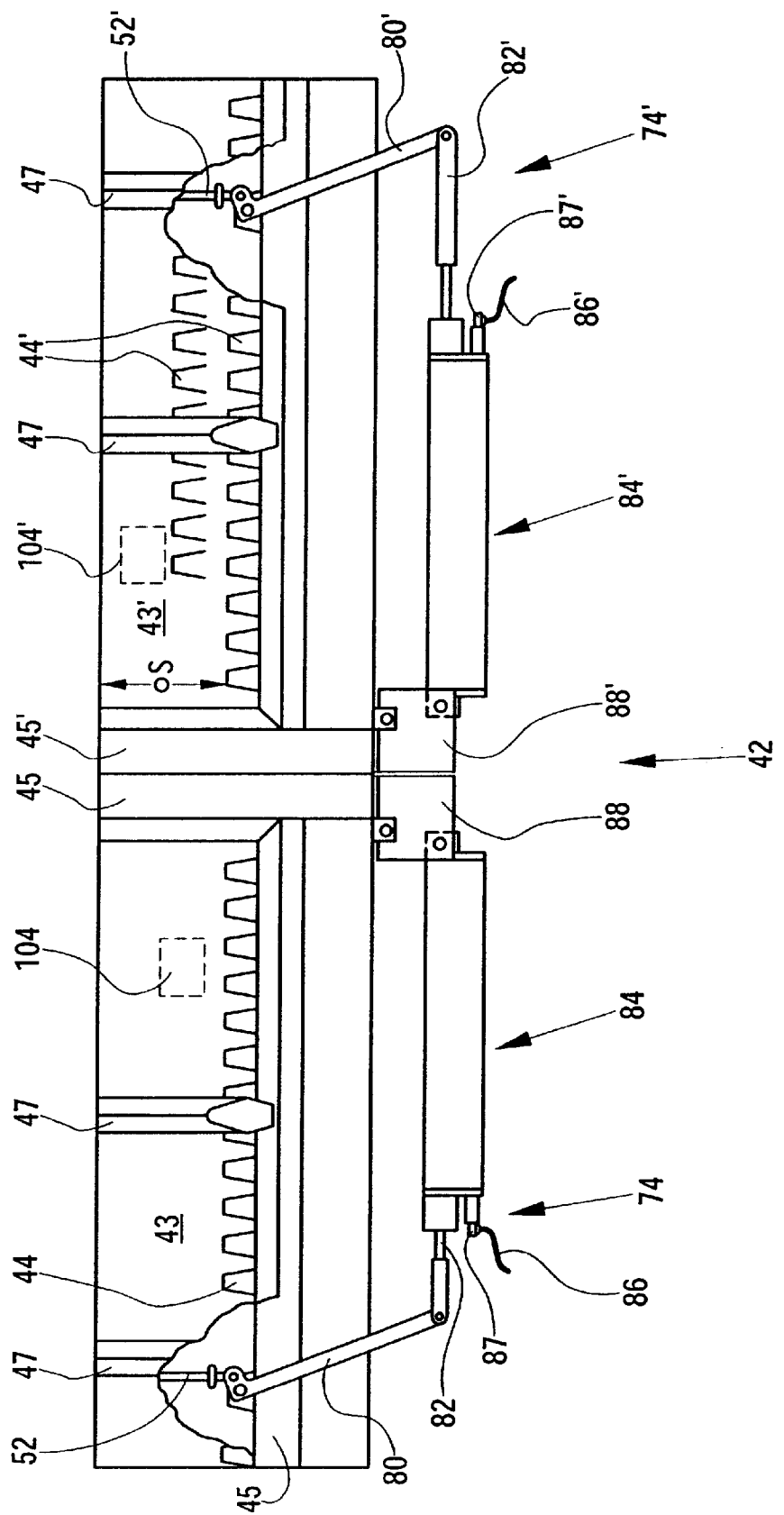
FIG. 2 is a top view of a first embodiment of the adjusting drives on the cleaning device.
Figure 3:
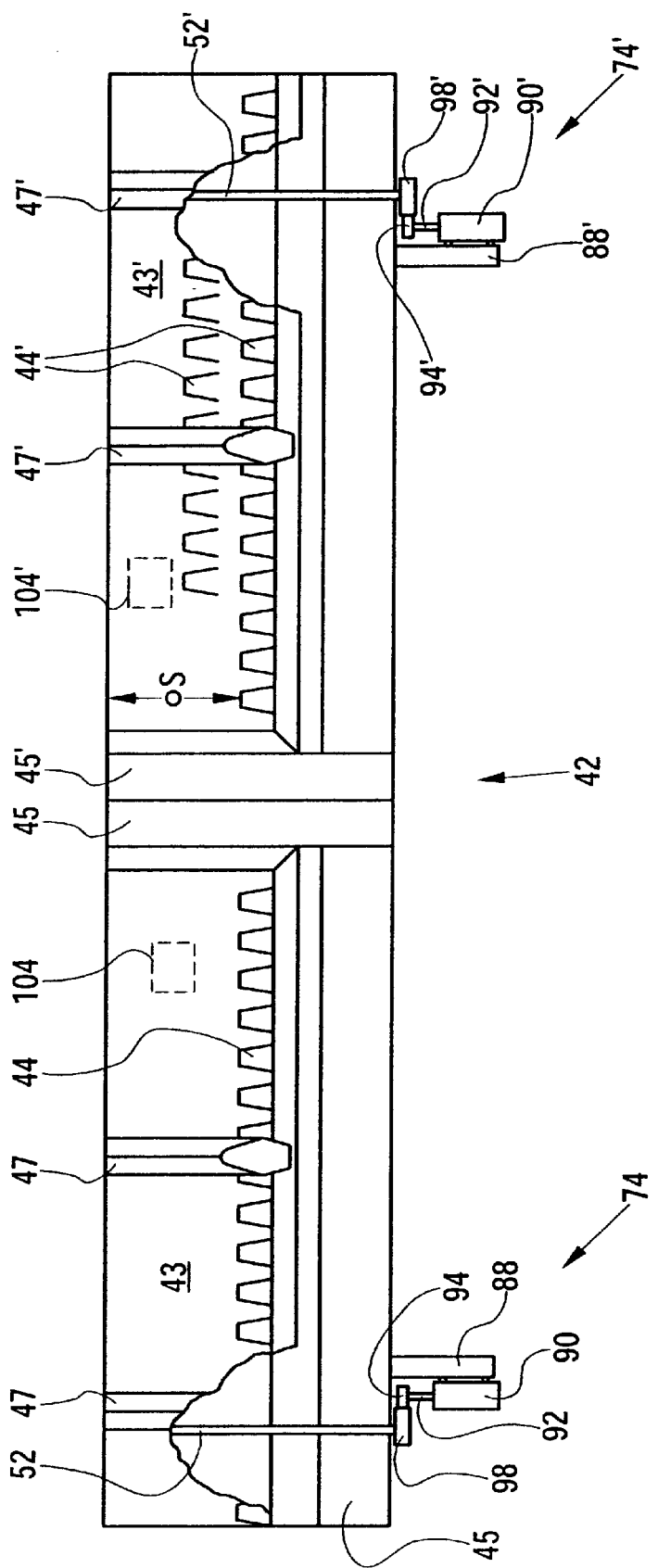
FIG. 3 is a top view of a second embodiment of the adjusting drives on the cleaning device.
Figure 4:
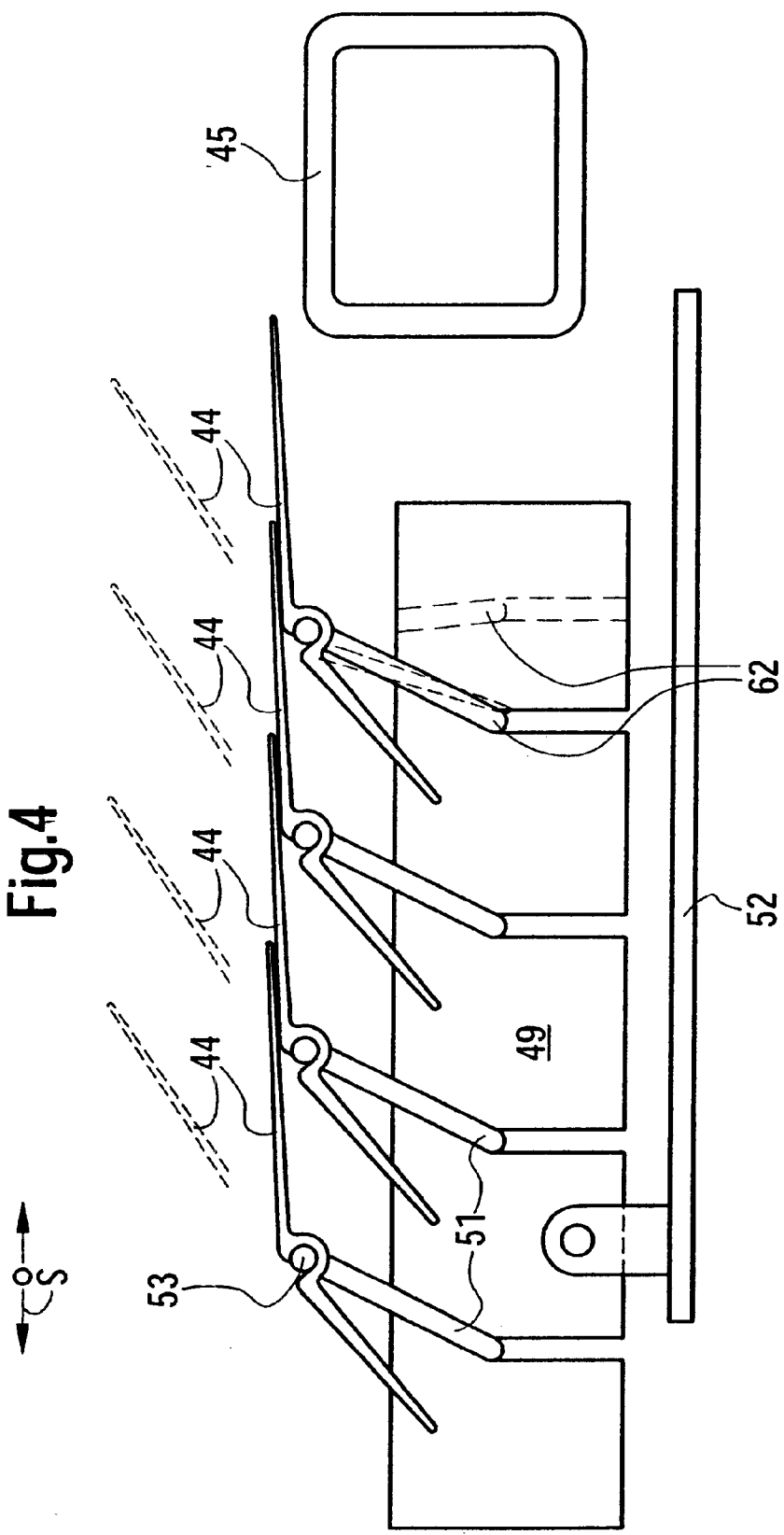
FIG. 4 is a side view of the adjustment mechanism of the louvers.

The upper sieve 40 and the lower sieve 42 are provided with transversely extending adjustable louvers 44, which, as shown in FIGS. 2 and 3, are mounted in a rectangular frame 45 which is carried by the side walls of the cleaning shoe 38. FIG. 4 indicates that each of the louvers 44 is equipped with a crankshaft 53 that contains a crank arm 51. The crank arm 51 is arranged in a slot of an adjusting rail 49 that extends in the driving direction of the harvester thresher 10. The adjusting rail 49 is arranged underneath a central crosspiece 47 of the frame 45 which is adjacent to an adjusting rod 52 and connected to and driven by said adjusting rod 52. In this way, an axial movement of the adjusting rod 52 makes possible the angular adjustment of all louvers 44 of a sieve element 43, 43' (see below) of the lower sieve 42 via the adjusting drive 76 as well as the angular adjustment of all louvers 44 of a sieve element of the upper sieve 40 via the adjusting drive 74. The adjusting rod 52 extends through the frame 45 on the rear side of the cleaning shoe 38 and is supported so that it can be displaced in its longitudinal direction.

FIG. 2 shows a lower sieve 42 that is equipped with a first embodiment of an adjusting drive 74 according to the invention. The lower sieve 42 is divided into two sieve elements 43, 43' that are arranged adjacent to one another, where each is respectively provided with an assigned frame 45, such that the sieve elements can be separately removed from the cleaning shoe 38 together with the respective adjusting drive 74, 74' for maintenance and cleaning purposes. Each sieve element 43, 43' is provided with a separate adjusting drive 74, 74' for adjusting the width of the sieve openings. The components of the sieve element 43' shown on the right are designated by the addition of an apostrophe after the reference numeral, whereas no apostrophe has been added to the reference numerals designating the components of the sieve element 43' shown on the left. The sieve elements of the upper sieve 40 are also provided with respectively assigned drives 76, although it would be conceivable to adjust both of these sieve elements with only one adjusting drive 76 if a corresponding lateral connection is provided.

The width of the openings between the schematically illustrated louvers 44 can be adjusted by means of the adjusting rod 52 and a bell crank 80 that can be pivoted about a vertical axis. Electrically driven linear motors 84, 84' that are coupled to the bell crank 80 are respectively mounted on consoles 88, 88' connected to the frame 45. The adjusting drive 74 shown in FIG. 2 is arranged on the frame 45 in such a way that the actuating direction extends approximately perpendicular to the oscillating direction S of the sieves. This provides the advantage that the sieve movement does not influence the rod 52 in the direction of the rod movement. The linear motor 84 is controlled via a flexible, multiwire electric line 86. The width of the sieve openings which is sensed by a sensor arranged within the housing of the linear motor 84 is also fed back to the controller 100 and displayed to the operator in the driver's cabin, respectively, over this electric line. It is particularly preferred to connect the adjusting device directly to a data bus system arranged in the harvester thresher 10. This makes it possible to reduce the number of wires in the line 86 and consequently the mass of the line oscillating therewith. The line 86 is coupled to the linear motor 84, 84' by means of a plug connection 87 that is separated when the frame 45 is removed from the cleaning shoe 38, leaving the electric line 86 in the cleaning shoe.

FIG. 3 shows a lower sieve 42 that is equipped with a second embodiment of an adjusting drive 74. The lower sieve 42 is composed of two sieve elements 43, 43' that are also arranged laterally adjacent to one another. Components of the sieve element 43' shown on the right are designated by the addition of an apostrophe to the reference numeral as in FIG. 2.

Each of the sieve elements 43, 43' contains an adjusting drive 74 in the form of an electric motor 90 that is mounted to the rear side of the frame 45 by means of a console-like holder 88. The electric motor 90 contains a rotatable shaft 92 that drives a first gear 94. The shaft 92 extends in the driving direction of the harvester thresher 10 which coincides with the oscillating direction S of the sieve. The first gear 94 cooperates with a second gear 98, the rotational axis of which extends parallel to the shaft 92. Internal threads that mesh with external threads arranged on the rear end of the adjusting rod 52 are formed at the center of the second gear 98. Since the adjusting rod 52 is supported such that it is unable to turn and can only be displaced in its longitudinal direction, a rotation of the second gear 98 is converted into a displacement of the adjusting rod 52 by the internal threads and the external threads. The electric motor 90 may be conventionally provided with a sensor that senses the rotational speed of its shaft 92. Alternatively, a stepper motor may be used. In both instances, the controller 100 that is electrically connected to the sensor and to the electric motor 90 is able to turn the electric motor 90 in such a way that the louvers 44 are moved into the desired position. The shaft 92 of the electric motor 90 extends in the oscillating direction S of the sieves. This provides the advantage that the sieve movement does not influence the rotor of the electric motor 90.

The controller 100 that is arranged in the operator's cabin 34 of the harvester thresher 10 and controls the adjusting drives 74, 74' is not only connected to the sensors that sense the position of the louvers 44, but also to various other sensors. An inclination sensor 102 senses the lateral inclination of the harvester thresher 10, for example, with a plumb weight that drives a potentiometer. A separation sensor 104 that measures the quantity of grain passing through the sieve elements 43, 43' is arranged underneath both sieve elements 43, 43' of the lower sieve. Although only one sensor is shown in FIG. 1, FIGS. 2 and 3 show both of the sensors 104.

Based on the signal of the inclination sensor 102, the controller 100 controls the adjusting drives 74, 74' differently, such that, when using the harvester thresher 10 on a hill that is laterally inclined relative to the vertical, the uphill sieve element 43 or 43' is closed further than the downhill sieve element.

The sensors 104 and 104' make it possible to sense the grain separation of the sieve elements 43, 43'. The controller 100 controls the adjusting drives 74, 74' separately and, if so required, differently, in order to achieve an optimal separation with the sieve elements 43, 43'.

What is claimed is:

1. A sieve assembly for a harvester thresher comprising:

at least two sieve elements arranged in a common plane, each sieve element including a frame, a plurality of adjustable louvers and a motor-driven adjusting drive to adjust the louvers;

a controller for controlling the adjusting drives of the sieve elements in such a way that the louvers of each sieve element can be moved to different positions; and an inclination sensor coupled to the controller to provide signals thereto wherein when the harvester thresher is operated on a hill, the controller adjusts the louvers on the uphill sieve element to a position further closed than the louvers of the downhill sieve element.

2. The sieve assembly as defined by claim 1 further comprising a separation sensor for each sieve element to sense the separation of grain and/or non-grain constituents underneath the respective sieve elements and provide an output signal to the controller which the adjusts the louver position as a function of the output signals of the separation sensors.

* * * * *